US011858731B2

(12) United States Patent
Gentry et al.

(10) Patent No.: US 11,858,731 B2
(45) **Date of Patent: *Jan. 2, 2024**

(54) INTERMEDIATE CONTAINER FOR INTEGRATION WITH A REFUSE VEHICLE

(71) Applicant: The Heil Co., Chattanooga, TN (US)

(72) Inventors: David C. Gentry, Chattanooga, TN (US); Bryan Stewart, Chattanooga, TN (US); Brian Ham, Huntsville, AL (US); Bobby Ray McKinney, Fort Payne, AL (US); John Wayne Bedwell, Southside, AL (US)

(73) Assignee: The Heil Co., Chattanooga, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/087,501

(22) Filed: Dec. 22, 2022

(65) Prior Publication Data

US 2023/0174296 A1 Jun. 8, 2023

Related U.S. Application Data

(63) Continuation of application No. 16/944,910, filed on Jul. 31, 2020, now Pat. No. 11,548,728, which is a continuation of application No. 15/613,905, filed on Jun. 5, 2017, now Pat. No. 10,737,880.

(60) Provisional application No. 62/346,018, filed on Jun. 6, 2016.

(51) Int. Cl.

*B65F 3/02* (2006.01)
*B65F 1/12* (2006.01)
*B65F 3/04* (2006.01)

(52) U.S. Cl.

CPC ............ *B65F 1/122* (2013.01); *B65F 3/0213* (2013.01); *B65F 3/043* (2013.01); *B65F 3/046* (2013.01); *B65F 3/041* (2013.01); *B65F 2003/0279* (2013.01); *B65F 2003/0283* (2013.01)

(58) Field of Classification Search

CPC ...... B65F 2003/0283; B65F 2003/0279; B65F 3/041; B65F 3/046; B65F 3/0213; B65F 1/122

See application file for complete search history.

(56) References Cited

U.S. PATENT DOCUMENTS

| | | | | |
|---|---|---|---|---|
| 6,632,064 | B1 | 10/2003 | Walker et al. | |
| 7,210,890 | B2 | 5/2007 | Curotto et al. | |
| 7,553,121 | B2 | 6/2009 | Curotto et al. | |
| 7,861,880 | B2 * | 1/2011 | Britt ................... | B65D 88/1687 220/666 |
| 8,092,141 | B2 | 1/2012 | Curotto et al. | |
| 8,330,059 | B2 | 12/2012 | Curotto | |
| 8,496,427 | B2 | 7/2013 | Curotto et al. | |

(Continued)

OTHER PUBLICATIONS

International Search Report and Written Opinion in International Application No. PCT/US2017/035944, dated Aug. 29, 2017, 12 pages.

*Primary Examiner* — Saul Rodriguez
*Assistant Examiner* — Willie W Berry, Jr.
(74) *Attorney, Agent, or Firm* — Fish & Richardson P.C.

(57) ABSTRACT

An intermediate container for a refuse vehicle where the container is positioned in front of the refuse vehicle is provided. A plurality of legs extends from the container toward the refuse vehicle. An attachment mechanism is on each leg to secure the legs to a front loading arm assembly of the refuse vehicle.

18 Claims, 8 Drawing Sheets

(56) References Cited

U.S. PATENT DOCUMENTS

| | | | |
|---|---|---|---|
| 8,556,117 B2 | 10/2013 | Curotto | |
| 8,674,243 B2 | 3/2014 | Curotto | |
| 8,753,062 B2 | 6/2014 | Curotto | |
| 8,979,142 B2 | 3/2015 | Curotto | |
| 9,067,730 B2 | 6/2015 | Curotto | |
| 9,272,843 B2 | 3/2016 | Parker | |
| 9,278,805 B2 | 3/2016 | Curotto | |
| 9,296,558 B2 | 3/2016 | Parker | |
| 10,377,568 B2 | 8/2019 | Rimsa | |
| 10,737,880 B2 | 8/2020 | Gentry et al. | |
| 2010/0322749 A1 | 12/2010 | Rowland et al. | |
| 2013/0266407 A1 | 10/2013 | Curotto et al. | |
| 2013/0322994 A1 | 12/2013 | Curotto et al. | |
| 2015/0093221 A1 | 4/2015 | Parker | |
| 2015/0232270 A1 | 8/2015 | Parker | |
| 2016/0010311 A1 | 1/2016 | Paull | |
| 2017/0349373 A1 | 12/2017 | Gentry et al. | |
| 2018/0037408 A1* | 2/2018 | Rimsa | B65F 1/122 |
| 2018/0327183 A1 | 11/2018 | Peek et al. | |
| 2019/0367270 A1 | 12/2019 | Rimsa | |
| 2021/0188540 A1 | 6/2021 | Gentry et al. | |

* cited by examiner

INTERMEDIATE CONTAINER FOR INTEGRATION WITH A REFUSE VEHICLE

CROSS-REFERENCE TO RELATED APPLICATIONS

This application is a continuation of U.S. application Ser. No. 16/944,910, entitled "An Intermediate Container For Integration With A Refuse Vehicle," filed on Jul. 31, 2020, which is a continuation of U.S. application Ser. No. 15/613,905, entitled "An Intermediate Container For Integration With A Refuse Vehicle," filed on Jun. 5, 2017, now U.S. Pat. No. 10,737,880, which claims the benefit of U.S. patent application Ser. No. 62/346,018, entitled "Refuse Vehicle With An Integrated Intermediate Container," filed Jun. 6, 2016, which are both incorporated herein by reference in their entirety.

FIELD

The present disclosure relates to intermediate containers for refuse vehicles and, more particularly, to an intermediate container coupled with a front loading arm assembly of a refuse vehicle.

BACKGROUND

Various types of devices exist for collecting refuse. For example, refuse vehicles may be configured as front loaders, rear loaders, automated side loaders, and/or grapple trucks. Refuse vehicles are typically utilized to pick up quantities of refuse for hauling to a determined area, such as a landfill, transfer station, or material recovery facility. Refuse vehicles can be further utilized or modified to collect recyclables or other materials for transport.

The allocation of waste removal equipment has been improved by the use of large trucks having compaction capabilities extending their effective range and capacity between unloadings. Further, the vehicles have been improved by the addition of specialized hoists to lift trash containers into the truck. These refuse vehicles have also been improved by the utilization of collection/intermediate containers (or "cans"). The intermediate container allows a refuse vehicle designed for the collection of large waste containers, such as dumpsters, to collect smaller, non-commercial waste containers. In some front loader configurations, the intermediate container includes channels or grooves along its base to receive the front loading forks of the refuse vehicle, allowing the refuse vehicle to hold and lift the intermediate can. Thus, the intermediate container is positioned above the forks as the container is carried and manipulated by the vehicle.

SUMMARY

Various systems and methods described in the present disclosure relate to (1) intermediate containers for refuse vehicles and (2) refuse vehicles including integrated intermediate containers. In some examples, the container is positioned in front of the refuse vehicle, with a plurality of legs extending from the container toward the refuse vehicle and an attachment mechanism on each leg securing the legs to a front loading arm assembly of the refuse vehicle. Advantages gained from such examples may include, but are not limited to: an elimination of the need for fork tine weldments to secure the intermediate container in place, a lower travel height of the intermediate container, and a reduced overall weight in the load that must be lifted by the front loading arms, which reduces the stress and strain on structural and hydraulic components of the intermediate container and/or the refuse vehicle. Certain examples of the present disclosure may also relate to improvements in the routing of non-structural components from the body of the truck to the intermediate container to better protect and conceal the components, reduce cab vibration, and/or reduce operating noise level (e.g., in comparison to intermediate containers that are connected to the tines of a fork).

According to a first aspect of the disclosure, an intermediate container for refuse vehicles comprises a bin to receive refuse. The bin is positioned in front of the refuse vehicle. A frame assembly is attached to the bin. The frame assembly includes a plurality of legs and a reinforcement member. The reinforcement member extends along a lower, rear side of the bin. The plurality of legs extends rearward from the frame assembly and the bin toward the refuse vehicle. An attachment mechanism is on each leg for securing the plurality of legs directly to at least one shaft extending from at least one arm of a front loading arm assembly of the refuse vehicle.

According to a second aspect of the present disclosure, a refuse vehicle comprises a cab, a hopper, a chassis, a front loading arm assembly, an intermediate container, a plurality of legs, and an attachment mechanism. The chassis is attached to the cab and the hopper. The front loading arm assembly is coupled to at least one of the chassis and the hopper. The intermediate container is for receiving refuse and is positioned in front of the refuse vehicle. The plurality of legs extends from the intermediate container toward the refuse vehicle. The attachment mechanism on each leg is for securing the plurality of legs directly to at least one shaft extending from at least one arm of the front loading arm assembly of the refuse vehicle.

According to yet another aspect of the disclosure, an intermediate container for refuse vehicles comprises a bin to receive refuse. A plurality of legs extends rearward from the bin toward the refuse vehicle. An attachment mechanism on each leg secures the plurality of legs directly to at least one shaft extending from at least one arm of a front loading arm assembly of the refuse vehicle.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
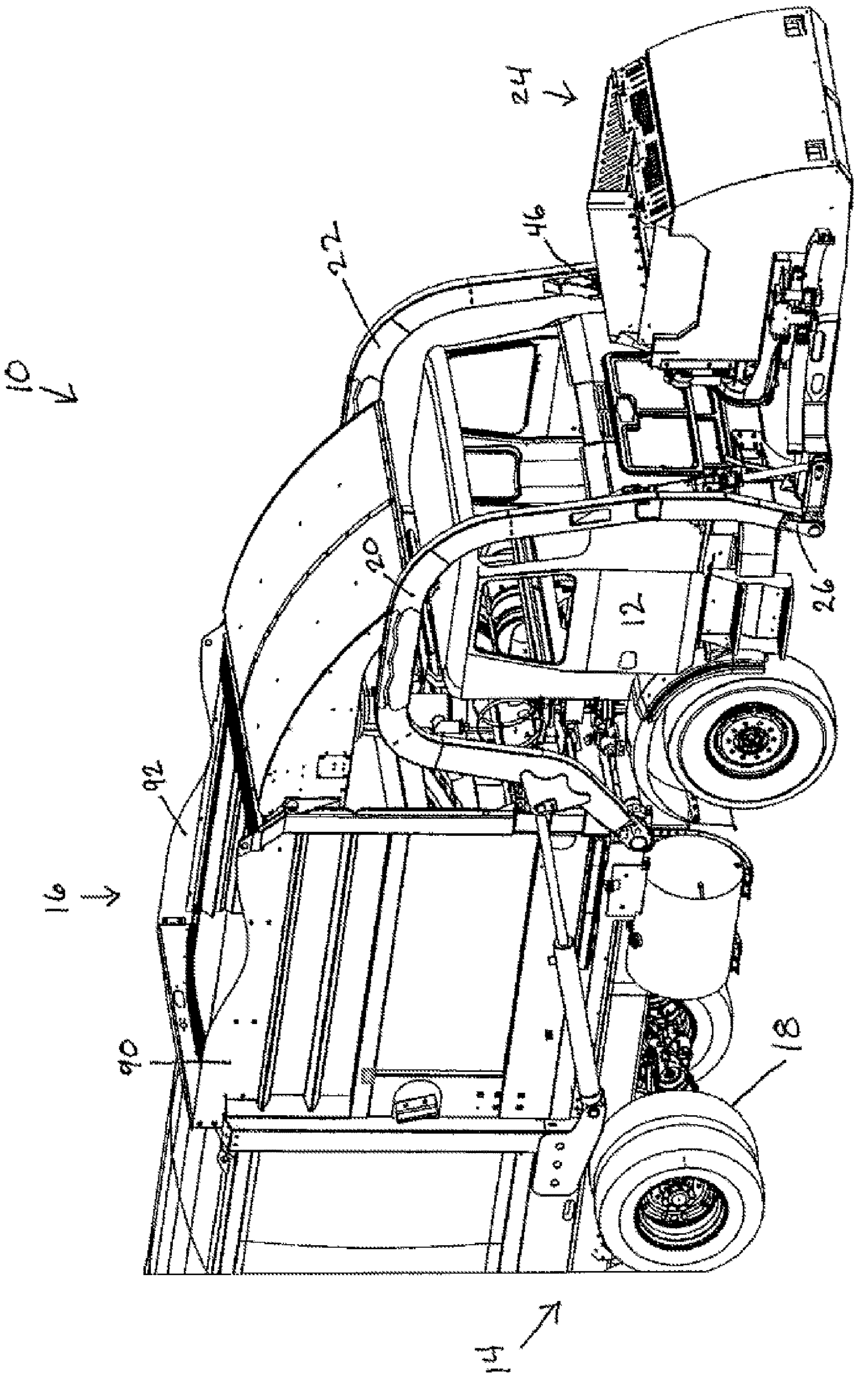
FIG. 1 is a perspective view of a refuse vehicle with an integrated intermediate container in accordance with one or more aspects of the present disclosure.

Example embodiments will now be described more fully with reference to the accompanying drawings. Turning to the figures, particularly FIGS. 1 and 2, a refuse vehicle is illustrated and designated with the reference numeral 10. The vehicle includes a cab 12, a chassis or frame 14, with a primary container or hopper 16. A drivetrain including wheels 18 moves the vehicle 10 in a conventional manner.

As shown, the vehicle 10 has a front loading arm assembly including a pair of front loading arms 20, 22. The arms 20, 22 are coupled with the vehicle 10 and an intermediate container 24. The arms 20, 22 have an overall U-shaped configuration. The arms may terminate at a connection end 26. In some aspects, the intermediate container 24 is pivotally coupled at the connection end 26.

Figure 3:
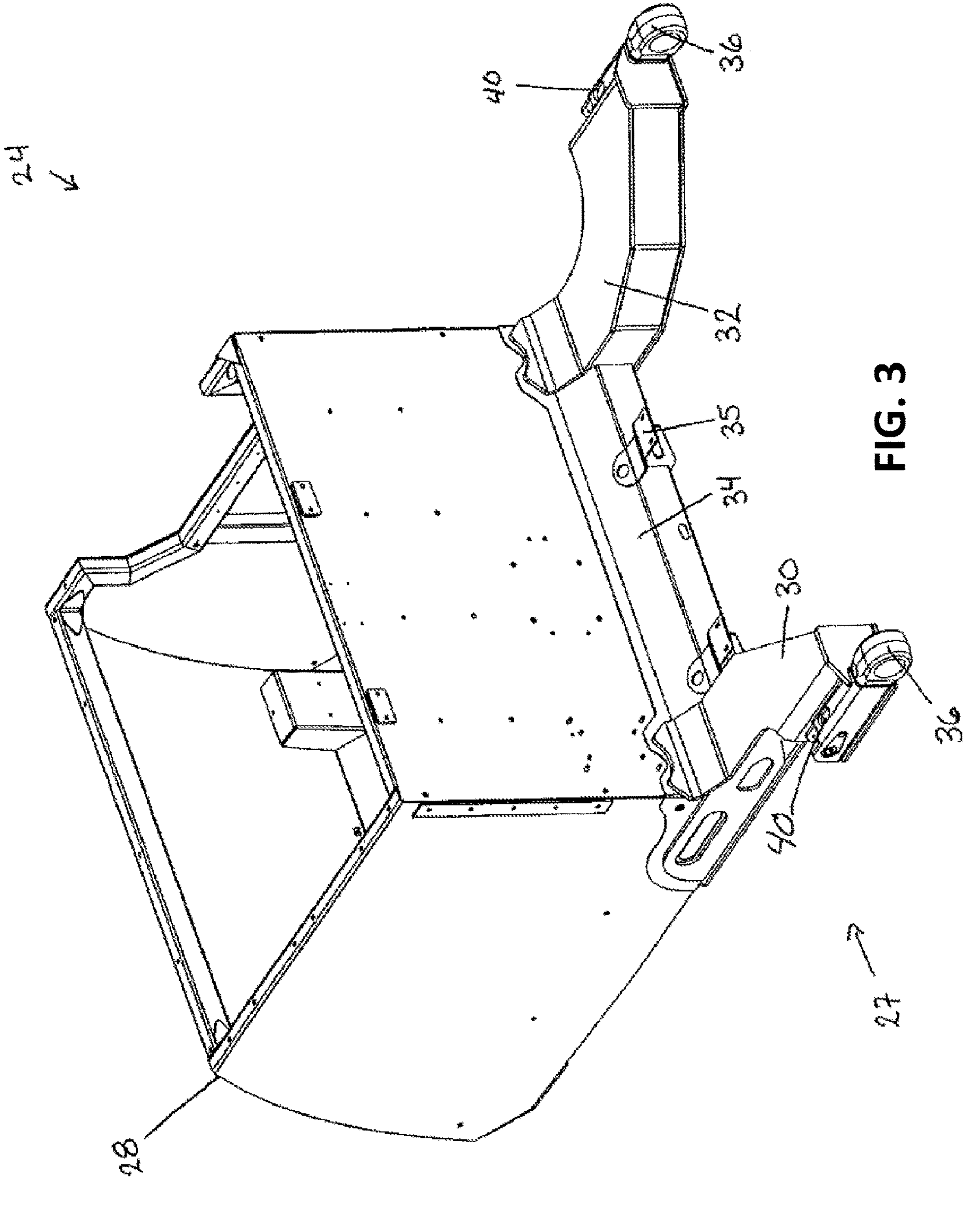
FIG. 3 is a rear perspective view of the intermediate container isolated from the vehicle in accordance with one or more aspects of the present disclosure.

Illustrated in FIG. 3, the intermediate container 24 has substantially two parts: a frame assembly 27 and a collection bin 28 attached to the frame assembly 27. The frame assembly 27 holds the collection bin 28 and allows it to be coupled with the arms 20, 22, such as at connection end 26. The frame assembly 27 includes a pair of legs 30, 32. The frame assembly 27 includes a reinforcement member 34 positioned adjacent the rear side of collection bin 28. Also, adding brackets 35 or the like can enable an automated grabber arm or the like to be positioned on the rear side of the collection bin 28. In some aspects, at least a portion of the automated grabber arm is positioned on a side of the collection bin 28.

Figure 2:
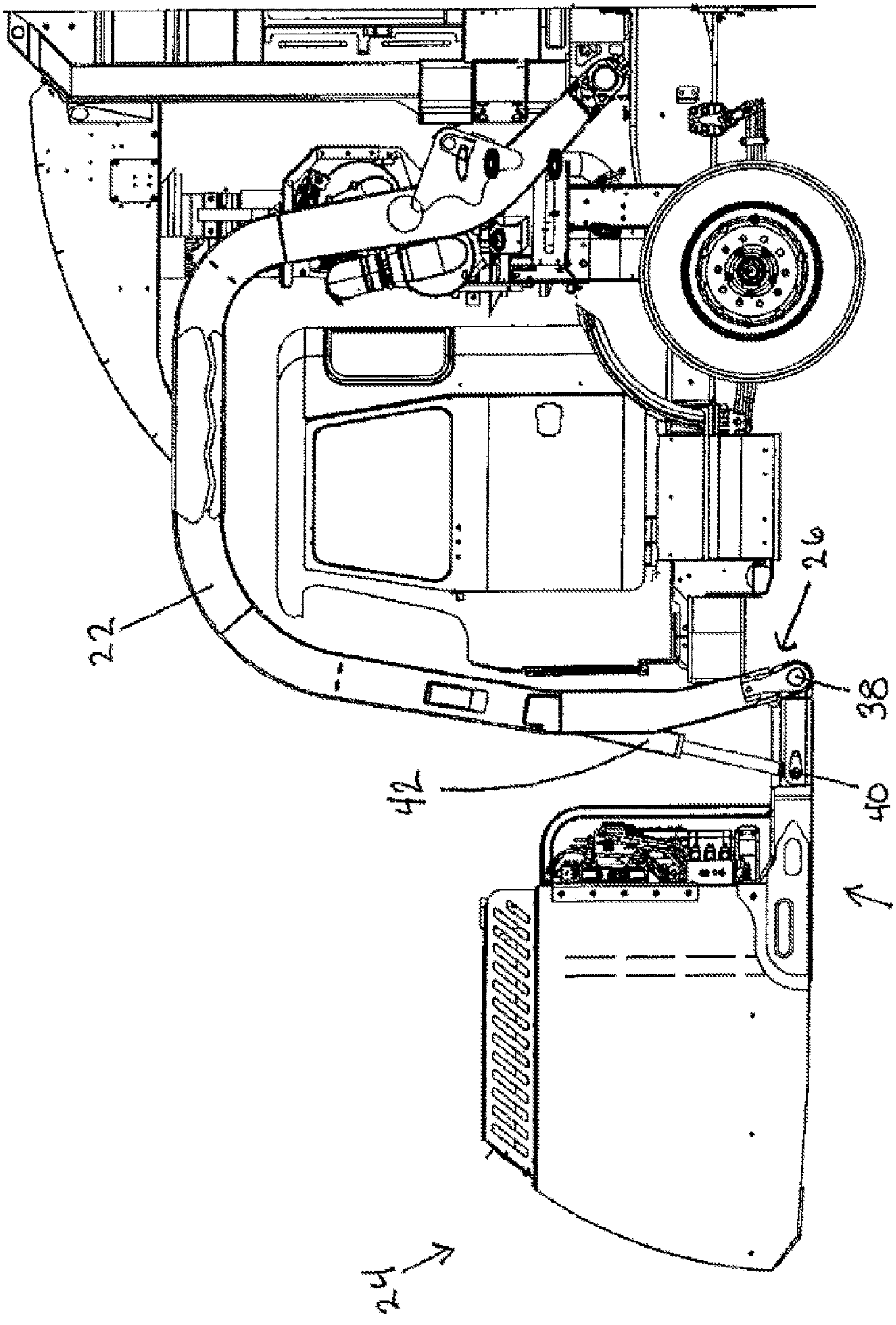
FIG. 2 is a side elevational view of the vehicle in FIG. 1.
Figure 4:
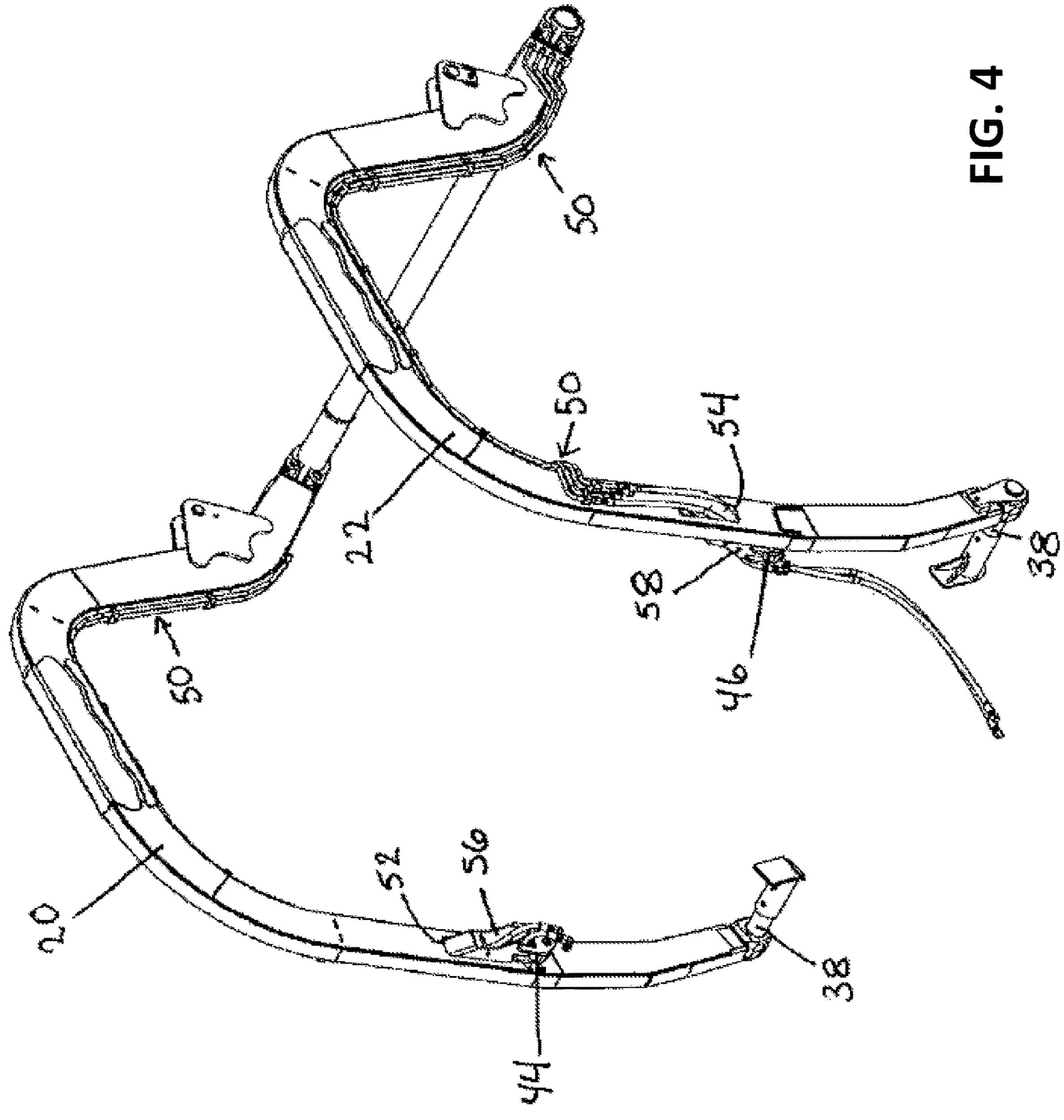
FIG. 4 is a perspective view of the front loading arms isolated from the vehicle with the protective arm covers removed in accordance with one or more aspects of the present disclosure.

The legs 30, 32 of frame assembly 27 have a desired configuration. Generally, the legs 30, 32 extend rearward of the collection bin 28. Each of the legs 30, 32 includes a retention mechanism (or attachment mechanism) 36 to couple the legs 30, 32 onto the arms 20, 22 of the front loading arm assembly. In this non-limiting example, the retention mechanism provides a direct attachment between the legs 30, 32 and the arms 20, 22 of the front loading arm assembly. In some aspects, the retention mechanism pivotally couples the legs 30 and 32 onto the connection end 26 of the front loading arms 20, 22. In some aspects, the retention mechanism 36 may be a ring that slides onto the pivot shafts 38 as seen in FIG. 2 and FIG. 4 in relation to the connection end 26 of the arms 20, 22. Thus the ring acts as a bearing to enable pivoting of the intermediate container 24 on the pivot shafts 38 so that the intermediate container 24 is integrated with the front loading arms 20, 22. The legs 30, 32 also include a boss 40 to receive actuating cylinders 42 which may be integrated with front loading arms 20, 22.

Accordingly, this configuration (without a fork or fork tines) may lower the travel height of the intermediate container by 5 to 6 inches. Additionally, this configuration reduces the overall weight that must be lifted by the front loading arms as a result of employing an intermediate container and may enable the lower travel height during movement of the vehicle from pick up point to pick up point. Additionally, due to the integral connection with the front loading arm assembly, this configuration may eliminate cab vibration as well as operating noise. Further, the reduced weight resulting from an integrated intermediate container decreases the stress on the structural member as well as the strain on the hydraulic components of the refuse vehicle and/or the intermediate container.

The cylinders 42 may be connected between the arm bosses 40 and the front loading arms 20, 22. The front loading arms 20, 22 may include brackets 44, 46 on the arms 20, 22, respectively, illustrated in FIGS. 4 and 5. The brackets 44, 46 project inward towards each other between the front loading arms 20, 22. Thus, the cylinders 42 are positioned inside of and spaced between the loading arms 20, 22. This embodiment enables the rotational movement of the intermediate container 24 during dumping of the container. The arms 20, 22 and container 24 are lifted and rotated to dump the container 24 into the primary container 16. Thus, with the cylinders 42 positioned on the inside of the arms 20, 22, the vehicle height can be reduced by about 5" or 6" lower than a standard vehicle set up. Thus, this reduces the overall height of the vehicle 10.

Turning to FIG. 4, hydraulic and or electrical lines 50 can be run along the underside of the front loading arms 20, 22. The lines and wires 50 pass through a cutout (or aperture) 52, 54, respectively, in the front loading arms 20, 22. The cutouts 52, 54 enable any of the lines 50 to pass into and through the front loading arms 20 and 22 to reach the cylinders 42. Additionally, some of the lines 50 may pass through to reach the intermediate container controller. The pass through aperture 52, 54 enables the lines 50 to be positioned inside of the arm for a more direct routing to the cylinders 42. Additionally, the cutouts 52, 54 provide a structural element to connect the front loading arm structure with the fork mounted cylinders 42. This can be accomplished by the housings 56, 58. The housings 56, 58 are positioned on the inside of the arms 20, 22. The housings 56, 58 provide the brackets 44, 46 to connect the cylinders 42 with the arms 20, 22. Thus, the lines 50 can be routed to the cylinders 42 at a higher position along the front loading arms 20, 22. Additionally, the route can be more direct and shorter to the lifting cylinders 42. Additionally, the lines 50 can be passed through at a recommended bend radius and reduce failure of the lines. The improved routing of non-structural components from the body of the truck to the intermediate container results in better component protection from the operating environment; it also visually conceals and so better integrates the components with the vehicle body.

Figure 5:
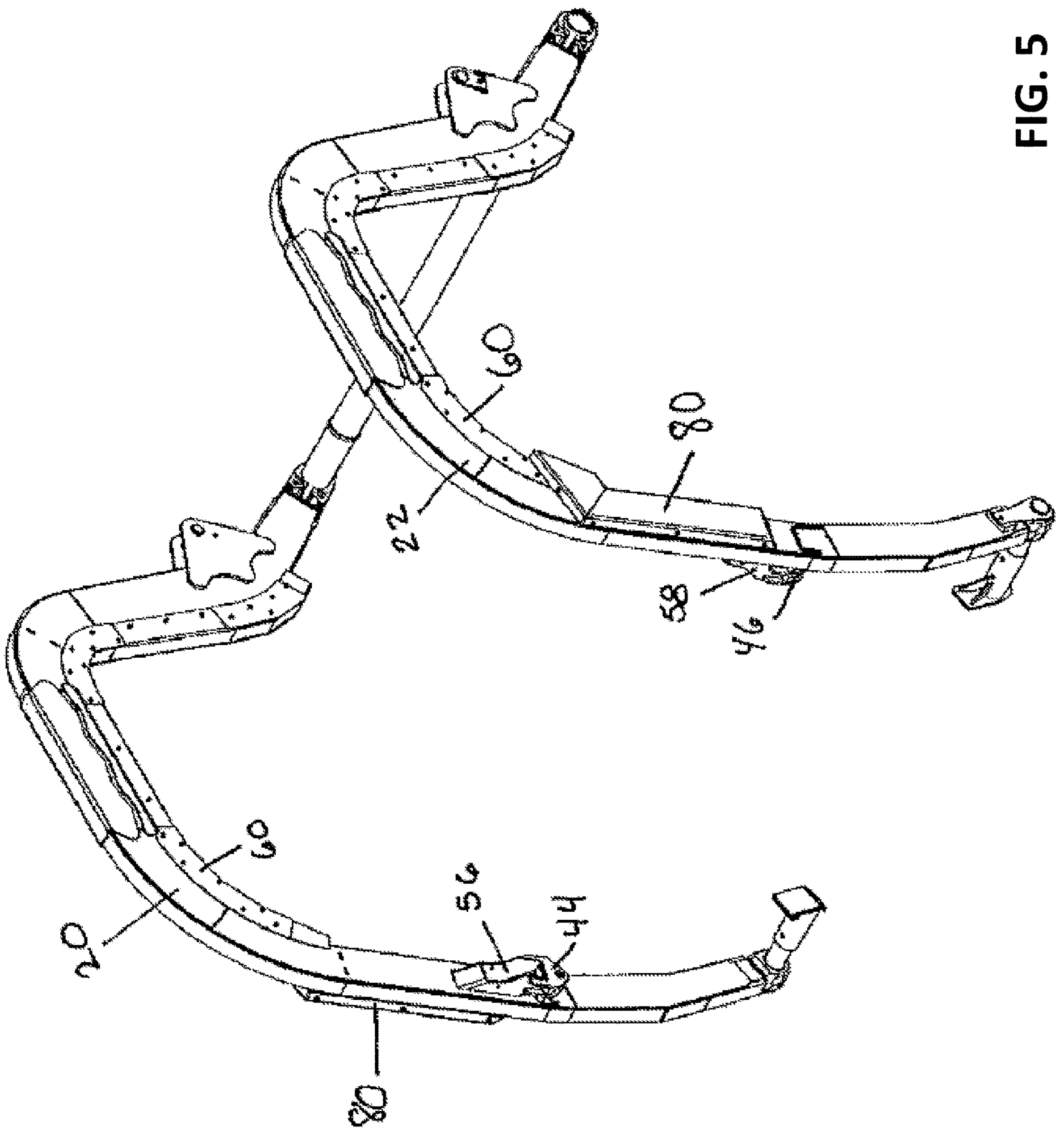
FIG. 5 is a perspective view of the front loading arms isolated from the vehicle in accordance with one or more aspects of the present disclosure.

Turning to FIG. 5, a perspective view of a cover on the front loading arms 20, 22 isolated from the vehicle 10 is illustrated according to aspects of the disclosure. The cover 60 is shaped to follow the inside contour of the arms 20, 22. Thus, by following the contour of the arms 20, 22, the cover 60 is shaped into an overall U.

Figure 6:
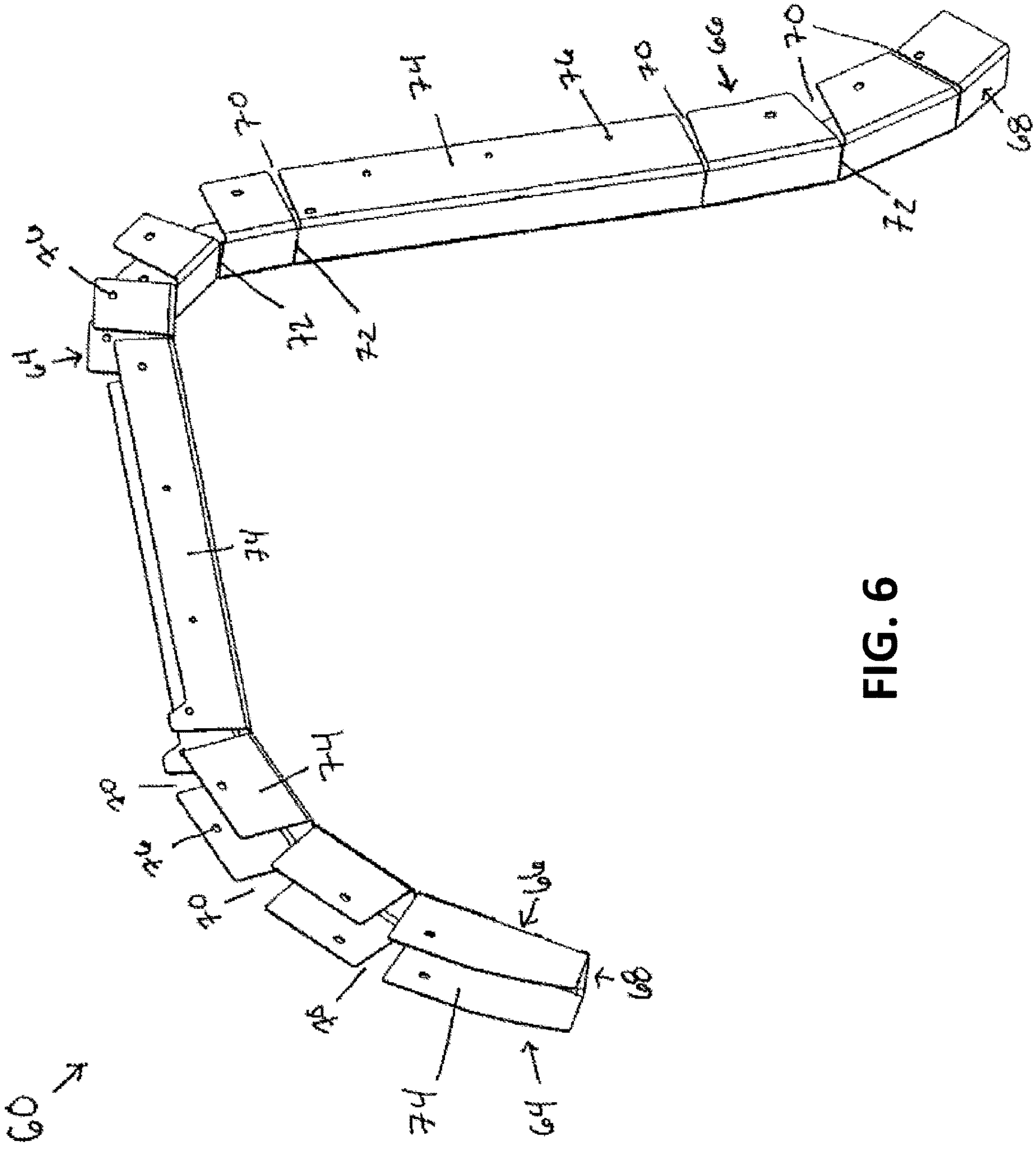
FIG. 6 is a perspective view of a protective arm cover isolated from the front loading arms and vehicle in accordance with one or more aspects of the present disclosure.

Illustrated in FIG. 6 is a perspective view of the protective arm cover 60 isolated from the front loading arms 20, 22 and vehicle 10 according to aspects of the disclosure. The cover 60 includes a frame with an overall U shape. The frame is defined by sidewalls 64, 66 as well as the web 68. The sidewalls 64, 66 include a plurality of cutouts 70. The cutouts 70 enable the cover 60 to be hand bent to follow the contoured shape of the front loading arms 20, 22. The cutouts 70 extend through the sidewalls 64, 66 and into the web 68. Also, the web 68 includes a plurality of slots or cutouts 72 that enhance the hand forming of the cover to conform to the contour of the front loader arms 20, 22. Additionally, the cutouts 70 divide the sidewalls into a plurality of portions 74.

The portions 74 may have the same or different configuration. The portions 74 include at least one aperture 76 to secure the portion 74 with the front loading arms 20, 22. The apertures 76 are aligned with one another on each sidewall 64, 66 so that a bolt or the like can be passed through the sidewalls 64, 66 and the front loading arm 20, 22 to secure the cover 60 to the front loading arm 20, 22. This enables the cover 60 to be secured with the front loading arms 20, 22 without the need for weldments or permanent securement to the front loading arms 20, 22. Additionally, a second cover 80 can be secured to the cover 60. The second cover 80, illustrated in FIG. 5, generally has an overall L-shape to cover the lines 50 at the pass through cutouts 52, 54. Thus, this enables the lines 50 to be covered from one side of the front loading arms to the other along the U-shape of the front loading arms 20, 22.

Thus, the cover 60 provides an aesthetically pleasing appearance while giving a unitary appearance to the front loading arms 20, 22. The cover 60 provides a large degree of flexibility, due to the bolt on design. This enables the cover 60 to be adjusted and fit onto the front loading arms 20, 22 even if a large amount of deformation occurs during welding of the front loading arms 20, 22.

Figure 7:
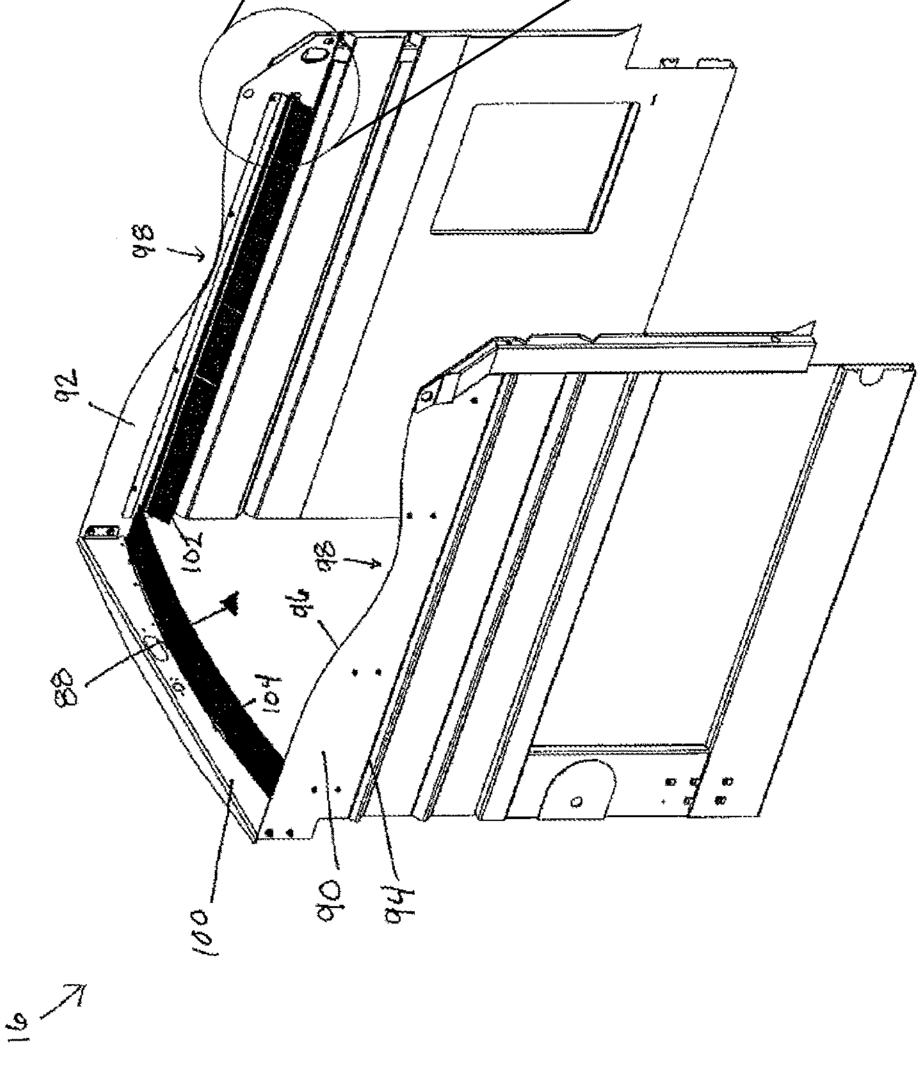
FIG. 7 is a perspective sectional view of the primary container including windscreens in accordance with one or more aspects of the present disclosure.

Turning to FIG. 7, a perspective sectional view of the primary container including windscreens is illustrated according to aspects of the disclosure. The primary container 16 has an opening 88. A pair of windscreens 90, 92 are positioned adjacent the opening 88 opposing one another. The windscreens 90, 92 have an elongated configuration with a horizontal edge 94 that secures with the primary container 16. Each windscreen 90, 92 includes a concave curve at some point along its top edge 96 with a low point 98 of the concave curve extending toward the horizontal bottom edge 94 of the windscreens 90, 92. The low point 98 of the curved portion reduces the height of the windscreens 90, 92. The windscreens 90, 92, while having a reduced height at low point 98 of the curved edge, prevent material from blowing out of the inside of the primary container 16.

Figure 8:
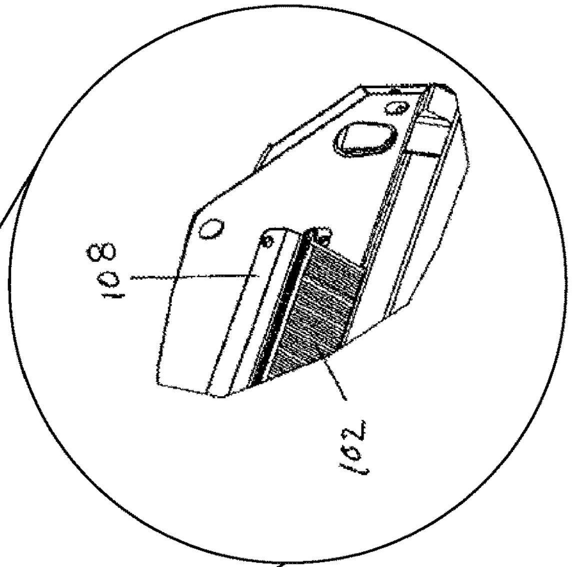
FIG. 8 is a detail view of the brush guard and spring bracket as called out in FIG. 7.
Figure 9:
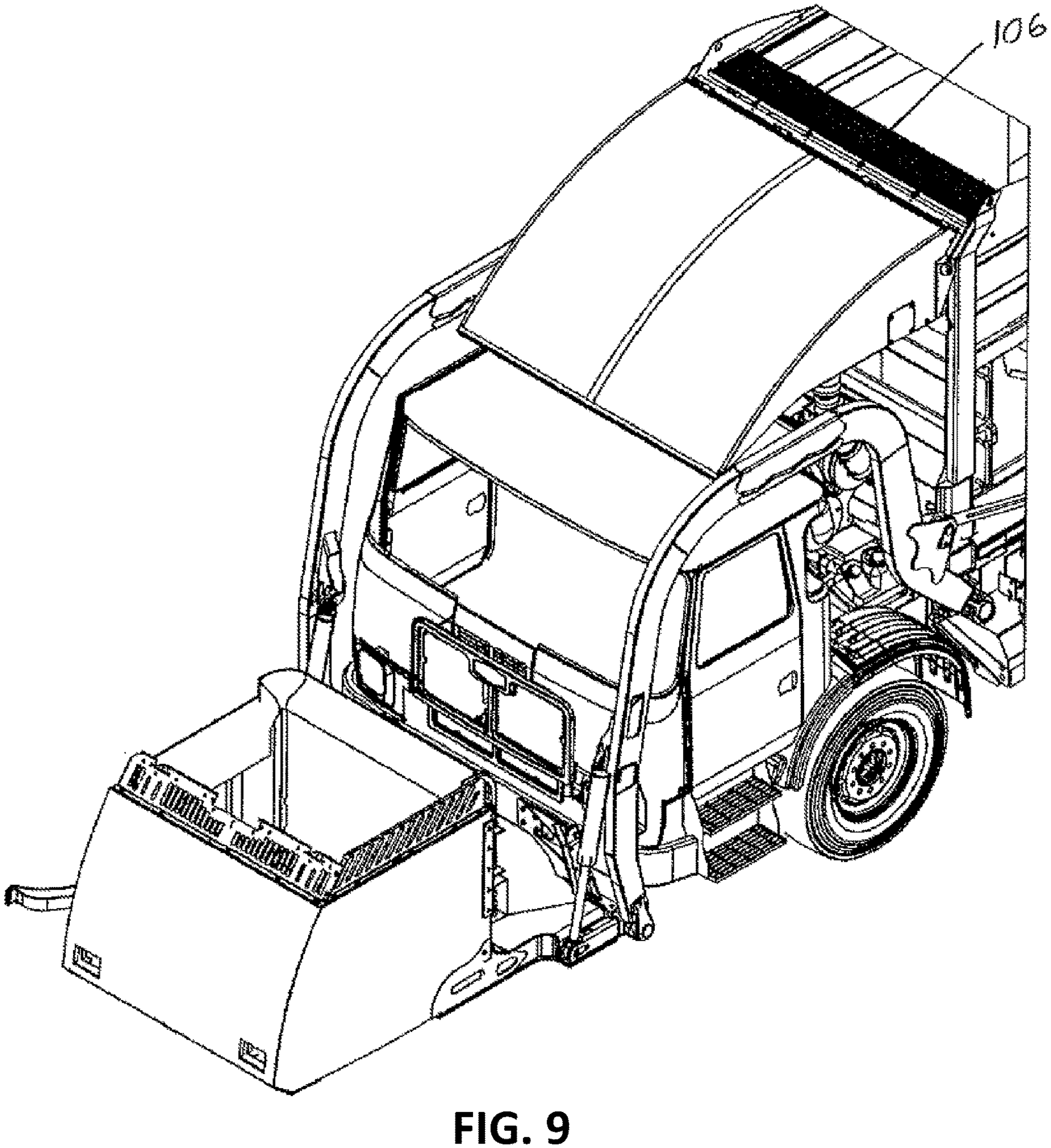
FIG. 9 is a perspective view of the front half of the vehicle in FIG. 1.

Also, a bridge 100 is positioned between the windscreens 90, 92 rearward of the primary container opening 88. The windscreens 90, 92 include horizontally positioned brush guards 102. The brush guards 102 extend from the windscreens 90, 92 angled downward toward the inside of the primary container 16. The bridge 100 includes a horizontally positioned brush guard 104 which is curved in a convex manner relative to the opening 88. A brush guard 106 is positioned horizontally between the frontward edges of windscreens 90, 92. The brush guard 106 (see FIG. 9) extends from the front edge of opening 88 angled upward away from the inside of primary container 16. This configuration of the brush guard 102 with a downward angle, brush guard 104 with a curved horizontal, and brush guard 106 with an upward angle creates a convoluted path for air passing around the opening 88 to aid against the blowing out of refuse that may be within the primary container 16. The brush guards 102 are horizontally mounted on the windscreens 90, 92, the brush guard 104 is horizontally mounted on the bridge 100, and the brush guard 106 is horizontally mounted against the front edge of opening 88. Thus, horizontal mounting provides a reduction in the overall height of the unit. Turning to FIG. 8, a detail view of brush guard 102 and spring bracket 108 as called out in FIG. 7 is illustrated. The brush guard 102 is mounted on a spring bracket 108. The spring bracket 108 enables the brush guards to move as the intermediate container 24 is dumped into the opening 88 on the primary container 16.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An intermediate container for a refuse vehicle comprising:
- a bin for receiving refuse, the bin positioned in front of the refuse vehicle;
- a plurality of legs coupled to the bin and extending toward the refuse vehicle; and
- each leg pivotally attached to at least one shaft extending from at least one arm of a front loading arm assembly of the refuse vehicle,
- wherein each leg is pivotally attached to the at least one shaft via a forkless connection.

2. The intermediate container for a refuse vehicle of claim 1, further comprising a frame assembly attached to the bin, the frame assembly including the plurality of legs extending rearward from the frame assembly.

3. The intermediate container for a refuse vehicle of claim 2, further comprising an automated grabber arm attached to at least one of the bin and the frame assembly, wherein at least a portion of the automated grabber arm is positioned on a side of the bin.

4. The intermediate container for a refuse vehicle of claim 1, further comprising a reinforcement member extending along a lower, rear side of the bin.

5. The intermediate container for a refuse vehicle of claim 1, further comprising the plurality of legs secured with a mounting bracket.

6. The intermediate container for a refuse vehicle of claim 1, wherein the at least one shaft extends from an end of the at least one arm of the front loading arm assembly of the refuse vehicle.

7. The intermediate container for a refuse vehicle of claim 1, further comprising each leg pivotally attached to the at least one shaft via a ring, a bracket, or a weldment.

8. The intermediate container for a refuse vehicle of claim 1, wherein the at least one shaft is two different pivot shafts that each extend from different arms of the front loading arm assembly.

9. A refuse vehicle comprising:
- a cab;
- a hopper;
- a chassis attached to the cab and the hopper;
- a front loading arm assembly coupled to at least one of the chassis or the hopper;
- an intermediate container for receiving refuse, the intermediate container positioned in front of the refuse vehicle; and
- a plurality of legs extending from the intermediate container and toward the refuse vehicle, each leg of the plurality of legs pivotally attached to at least one shaft extending from at least one arm of the front loading arm assembly of the refuse vehicle, wherein each leg is pivotally attached to the at least one shaft via a forkless connection.

10. The refuse vehicle of claim 9, further comprising the plurality of legs secured with a mounting bracket.

11. The refuse vehicle of claim 9, wherein the intermediate container includes a frame assembly and a bin, wherein the frame assembly is attached to the bin, and wherein the frame assembly includes the plurality of legs extending rearward from the frame assembly.

12. The refuse vehicle of claim 11, further comprising a reinforcement member extending along a lower, rear side of the bin.

13. The refuse vehicle of claim 9, further comprising an automated grabber arm attached to the intermediate container, wherein at least a portion of the automated grabber arm is positioned on a side of the intermediate container.

14. The refuse vehicle of claim 9, wherein the at least one shaft extends from an end of the at least one arm of the front loading arm assembly of the refuse vehicle.

15. The refuse vehicle of claim 9, further comprising each leg pivotally attached to the at least one shaft via a ring, a bracket, or a weldment.

16. The refuse vehicle of claim 9, wherein the at least one shaft is two different pivot shafts that each extend from different arms of the front loading arm assembly.

17. An intermediate container for a refuse vehicle comprising:

a bin for receiving refuse; and a plurality of legs extending rearward from the bin toward the refuse vehicle, each leg pivotally attached to at least one shaft extending from at least one arm of a front loading arm assembly of the refuse vehicle, wherein each leg is pivotally attached to the at least one shaft via a forkless connection.

18. The intermediate container for a refuse vehicle of claim 17, wherein the forkless connection comprises at least one of a ring, a bracket, or a weldment.

* * * * *